United States Patent [19]

McNary

[11] Patent Number: 6,087,301

[45] Date of Patent: Jul. 11, 2000

[54] GRANULAR ABSORBENT COMPOSITION

[76] Inventor: Janice N. McNary, 4490 Margarete Ave., Las Vegas, Nev. 89121

[21] Appl. No.: 09/277,201

[22] Filed: Mar. 26, 1999

[51] Int. Cl.⁷ .............................. B01J 21/16; B01J 20/22; B01J 20/00
[52] U.S. Cl. .............................. 502/404; 502/80; 502/401
[58] Field of Search ................................ 502/80, 401, 404

[56] References Cited

U.S. PATENT DOCUMENTS

| | | |
|---|---|---|
| 3,673,095 | 6/1972 | Archer . |
| 4,240,800 | 12/1980 | Fischer . |
| 5,067,984 | 11/1991 | Starr . |
| 5,213,690 | 5/1993 | Wollrich . |
| 5,266,547 | 11/1993 | Wollrich . |
| 5,315,923 | 5/1994 | Tokarski et al. .......................... 100/39 |
| 5,415,131 | 5/1995 | Dodman ................................. 119/171 |
| 5,492,881 | 2/1996 | Diamond . |

*Primary Examiner*—Tom Dunn
*Assistant Examiner*—Cynthia M Donley
*Attorney, Agent, or Firm*—Terrance L. Siemens

[57] ABSTRACT

A composition for a granular solid possessing superior absorbancy for absorbing oils. The composition includes perlite plaster aggregate, corn starch, and sodium bicarbonate, all being dry and powdered. Proportions of the constituent materials is nine parts by volume perlite aggregate, two parts by volume corn starch, and one part by volume sodium bicarbonate.

3 Claims, No Drawings

GRANULAR ABSORBENT COMPOSITION

BACKGROUND OF THE INVENTION

1. Field of the Invention

The present invention relates to compositions for absorbing spilled liquids. More particularly, the invention sets forth a powdered composition particularly suitable for absorbing oils, greases, and other fluids containing non-polar molecules. The composition is useful in consumer, industrial, commercial, and industrial applications, particularly where there is the hazard of spills and unintended discharges of oily substances on solid ground.

2. Description of the Prior Art

Controlling liquid spills has long plagued mankind. Liquid spills may be small in scale, such as those involving personal activities such as cooking or attending to maintenance of a motor vehicle. Of course, accidents involving transport of bulk quantities of liquids, or incidental discharge of operating fluids of large motor vehicles entail similar problems but to a greater degree. In most cases, an absorbent solid is placed on the spilled liquid and absorbed. Solids employed in this capacity have typically included fabrics, papers, and granular or powdered form. Naturally occurring substances such as sand and pulverized ceramic substances are frequently employed, especially for large scale spills. The absorbent material is gathered after it has absorbed a satisfactory amount of the spill.

Oils and similar fluids have presented special problems due to their slipperiness and ability to permeate many varieties of materials. They can saturate construction materials such as concrete and asphalt. There remains a need for an absorbent material capable of absorbing and controlling oils and oily fluids.

In the past, effectiveness of purpose has been the primary consideration in formulating absorbents. However, there has been a recent trend towards sound environmental practice, which requires that an absorbent not present environmental hazards of its own.

U.S. Pat. No. 3,673,095, issued to Ralph H. Archer on Jun. 27, 1972, teaches the use of calcined gypsum and perlite in an oil absorbent including sphagnum moss. This formulation lacks corn starch and sodium carbonate, as employed in the present invention. The novel composition omits sphagnum moss.

U.S. Pat. No. 4,240,800, issued to Karl O. P. Fischer on Dec. 23, 1980, describes preparation of bagasse for an oil binder. There is no teaching of gypsum, perlite, corn starch, or sodium bicarbonate.

U.S. Pat. No. 5,067,984, issued to Tina F. Starr on Nov. 26, 1991, describes an oil absorbent incorporating a plant carrier, such as wheat flour. There is no mention of gypsum, perlite, corn starch, or sodium bicarbonate, all of which are ingredients of the novel composition.

U.S. Pat. Nos. 5,213,690, issued to Gary W. Wollrich on May 25, 1993, and 5,266,547, issued to Gary W. Wollrich on Nov. 30, 1993, set forth an absorbent composition including sugar and diatomaceous earth. Wollrich is silent regarding gypsum, perlite, corn starch, and sodium bicarbonate, all being ingredients of the present invention. Moreover, vinegar would chemically attack sodium bicarbonate. Thus the formulation of Wollrich would be incompatible with the present invention.

U.S. Pat. No. 5,492,881, issued to Charles M. Diamond on Feb. 20, 1996, describes a composition incorporating cellulose treated to enhance both olephilic and hydrophobic properties. Diamond's invention lacks gypsum, perlite, corn starch, and sodium carbonate, which are the ingredients of the present invention.

The prior art has proposed many formulations for absorbing oils. However, none of the above formulations include all ingredients seen in the novel composition. None of the above inventions and patents, taken either singly or in combination, is seen to describe the instant invention as claimed.

SUMMARY OF THE INVENTION

The present invention sets forth a composition which is particularly effective at absorbing oils and oily natural and synthetic, non-polar, and weakly polar fluids. The novel composition has unexpectedly effectiveness as an absorbent and in other ways. In one example, the novel composition is compatible with frequently encountered environmental surfaces such as tile and linoleum. The novel composition includes perlite, corn starch, and sodium bicarbonate. Perlite possesses superior oil absorbing properties. In a preferred form, perlite is employed as part of plaster aggregate. In combination with corn starch and sodium bicarbonate, the latter popularly known as baking soda, the aggregate enjoys enhanced properties of absorbancy.

The novel composition utilizes commonly available, inexpensive constituent materials which have no adverse effects upon the environment. For these reasons, the novel composition, once spent after performing its function, can be gathered in any feasible way and disposed without requiring special facilities or treatment. Yet effectiveness in absorbing oils is unsurpassed by any other material in the experience of the applicant.

The novel composition is therefore highly suitable as a consumer product as well as finding utility in industrial, institutional, and commercial applications. It works well in cooking environments and also with automotive lubricants and working fluids such as power steering fluids, brake fluids, and others. It is of low density, and therefore is easily transported and handled by consumers.

Accordingly, it is a principal object of the invention to provide an effective absorbent material for absorbing oily substances.

It is another object of the invention that the constituent materials be commonly available and known to the public.

It is a further object of the invention that the constituent materials, both individually and when combined, entail minimal environmental hazard.

Still another object of the invention is that the spent composition may be readily gathered and easily disposed after use.

A further object of the invention is that the composition be readily transported and handled.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification.

DETAILED DESCRIPTION OF THE PREFERRED EMBODIMENTS

The novel absorbent composition is made by providing and blending perlite plaster aggregate, corn starch, and sodium bicarbonate. The plaster aggregate may be any commercial product suitable as a construction material. Preferably, the plaster aggregate includes plaster of paris, or anhydrous calcium sulfate. The invention contemplates using any finely comminuted vegetable starch, corn starch being widely used and well known to consumers generally. The same is true of the third constituent material, sodium bicarbonate, which trades under the common name of baking soda.

An exemplary suitable formulation comprises proportions of nine parts by volume of perlite plaster aggregate, two parts by volume of corn starch, and one part by volume of sodium bicarbonate. These materials are provided in dry, granular or powdered form, and blended.

The principal constituent material, perlite, is essentially silica which has been expanded due to heating to the point that a small water content, which is typically two to six percent, boils into steam, thus creating many bubbles, openings, or interstitial spaces in the silica. The pH of perlite, is neutral, and it possesses no known toxicity. The second predominant constituent material, corn starch, is biodegradable. The last material, sodium bicarbonate, is weakly alkaline and is not categorized as hazardous.

The composition is quite light, or of low density. The density of the principal constituent, perlite, varies in natural form from 0.1 to 0.4.

Effectiveness of the novel composition may possibly be due to a synergistic effect enhancing the effect of perlite by adding surface area that naturally present in the many interstitial spaces in perlite. Additional surface area is provided by powdered plaster, corn starch, and sodium bicarbonate. Additional surface area may possibly promote capillary action as oils are absorbed. Regardless of the mechanism by which the novel composition functions, its abilities to absorb oils are vastly superior to other known granular or powdered absorbents.

The novel composition is easily employed by spreading it on spills. This can be done manually in household and other consumer applications. The composition may be employed on frequently encountered environmental surfaces such as tile, carpet, linoleum, and other household surfaces. It may be that the corn starch and sodium bicarbonate counter abrasion that might otherwise occur if perlite, either alone or in combination with plaster, were employed in the absence of corn starch and sodium bicarbonate. The composition acts reasonably quickly, although more absorbing time may be required when a spill has occurred on a porous surface.

It is to be understood that the present invention is not limited to the embodiments described above, but encompasses any and all embodiments within the scope of the following claims.

I claim:

1. A composition for an absorbent granular solid material, comprising perlite, vegetable starch, and sodium bicarbonate wherein said perlite is provided in the form of an aggregate also including plaster of paris and wherein perlite aggregate is provided in a proportion of about nine parts by volume, vegetable starch is provided in a proportion of about two parts by volume, and sodium bicarbonate is provided in a proportion of about one part by volume.

2. The composition according to claim 1, wherein the vegetable starch is corn starch.

3. A composition for an absorbent granular solid material, comprising perlite plaster aggregate, corn starch, and sodium bicarbonate, wherein the aggregate, the corn starch, and the sodium bicarbonate are provided in powdered, dry form, and perlite aggregate is provided in a proportion of nine parts by volume, corn starch is provide in a proportion of two parts by volume, and sodium bicarbonate is provided in a proportion of one part by volume.

* * * * *